(12) United States Patent
Yamamoto

(10) Patent No.: US 12,115,799 B2
(45) Date of Patent: Oct. 15, 2024

(54) PRINTING APPARATUS AND PRINTING METHOD

(71) Applicant: SEIKO EPSON CORPORATION, Tokyo (JP)

(72) Inventor: Gakuji Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 96 days.

(21) Appl. No.: 17/809,027

(22) Filed: Jun. 27, 2022

(65) Prior Publication Data

US 2022/0410561 A1 Dec. 29, 2022

(30) Foreign Application Priority Data

Jun. 29, 2021 (JP) ................................. 2021-107558

(51) Int. Cl.
*B41J 2/21* (2006.01)
*B41J 2/045* (2006.01)

(52) U.S. Cl.
CPC ......... *B41J 2/2135* (2013.01); *B41J 2/04505* (2013.01); *B41J 2/04586* (2013.01)

(58) Field of Classification Search
CPC ... B41J 2/2135; B41J 2/04505; B41J 2/04586
See application file for complete search history.

(56) References Cited

U.S. PATENT DOCUMENTS

2008/0252673 A1* 10/2008 Wada ................ B41J 2/04505
347/41
2018/0257393 A1 9/2018 Sato et al.

FOREIGN PATENT DOCUMENTS

JP 2018-149690 A 9/2018

* cited by examiner

*Primary Examiner* — Geoffrey S Mruk
(74) *Attorney, Agent, or Firm* — Global IP Counselors, LLP

(57) ABSTRACT

A printing apparatus comprising a printing head including a plurality of nozzles, a correction value setting unit configured to set a correction value, a printing data generation unit configured to correct image data and a printing control unit configured to cause to print a first region and a second region on, based on the image data after correction, wherein the printing control unit causes to print one of the first raster lines with a predetermined number of the nozzles and to print one second raster line with a number, greater than the predetermined number, of the nozzles, and the correction value setting unit sets the correction value applied to the second raster line and the correction value applied to some of the first raster lines, in accordance with a printing condition that changes a concentration difference of the second raster line from the first raster lines.

4 Claims, 11 Drawing Sheets

PRINTING APPARATUS AND PRINTING METHOD

The present application is based on, and claims priority from JP Application Serial Number 2021-107558, filed Jun. 29, 2021, the disclosure of which is hereby incorporated by reference herein in its entirety.

BACKGROUND

1. Technical Field

The present disclosure relates to a printing apparatus and a printing method.

2. Related Art

An inkjet printer performs printing on a printing medium by moving a printing head, which includes a plurality of nozzles aligned in a predetermined nozzle alignment direction, and the printing medium in a relative manner in a relative moving direction intersecting with the nozzle alignment direction and ejecting ink dots from the respective nozzles in accordance with print data. In a known configuration of a printing head of a printer of this kind, a plurality of head chips including nozzle rows in which a plurality of nozzles are aligned are combined with each other, and the nozzle rows overlap with each other at a joint portion of the two adjacent head chips. When the nozzle rows partially overlap with each other, an overlap region and a non-overlap region are generated on the printing medium. The overlap region has raster lines in which dots are formed along the relative moving direction by using the plurality of nozzles. The non-overlap region has raster lines in which dots are formed along the relative moving direction by using a single nozzle.

Further, it has been known that a correction value for correcting concentration for each raster line is set to correct data for each raster line, for the purpose of suppressing concentration variation among the respective raster lines on the printing medium, which is caused by variation of ejection characteristics of the respective nozzles (see JP-A-2018-149690).

Here, the number of nozzles used for printing of the raster lines in the non-overlap region and that in the overlap region are different from each other. Thus, concentration in the overlap region on the printing medium is higher or lower than that in the non-overlap region, and hence a dark streak or a light streak is visually recognized. It is ideal that the printing head is mounted to the printer without inclination. Still, in some cases, the printing head may be slightly inclined in each printer as a product. A concentration difference between the non-overlap region and the overlap region varies in accordance with such inclination. In JP-A-2018-149690 given above, data processing for correcting concentration of raster lines in the overlap region is executed based on such inclination. Note that, in addition to inclination of the printing head, any factor can change a concentration difference between the non-overlap region and the overlap region.

In view of the circumstances, there has been demanded further improvement for suppressing concentration unevenness in a streak form at the time of correcting concentration of raster lines.

SUMMARY

A printing apparatus includes a printing head including a plurality of nozzles configured to eject ink of a predetermined color, a correction value setting unit configured to set a correction value for each of raster lines for correcting concentration of each raster line, the raster line being expressed by aligning dots of the ink along a first direction, a printing data generation unit configured to correct image data with the correction value for each raster line, and a printing control unit configured to cause the printing head to print a first region and a second region on a printing medium, based on the image data after correction, the first region including a plurality of first raster lines that are expressed by the ink and are aligned in a second direction intersecting the first direction, the second region being sandwiched between the first regions in the second direction and including a second raster line expressed by the ink, the printing control unit causes the printing head to print one of the first raster lines with a predetermined number of the nozzles and to print one second raster line with a number, greater than the predetermined number, of the nozzles, and the correction value setting unit sets the correction value applied to the second raster line and the correction value applied to some of the first raster lines including the first raster line adjacent to the second region, in accordance with a printing condition that changes a concentration difference of the second raster line from the first raster lines.

A printing method for controlling a printing head including a plurality of nozzles configured to eject ink of a predetermined color and performing printing on a printing medium, the method includes a correction value setting step for setting a correction value for each of raster lines for correcting concentration of each raster line, the raster line being expressed by aligning dots of the ink along a first direction, a printing data generation step for correcting image data with the correction value for each raster line, and a printing control step for causing the printing head to print a first region and a second region on the printing medium, based on the image data after correction, the first region including a plurality of first raster lines that are expressed by the ink and are aligned in a second direction intersecting the first direction, the second region being sandwiched between the first regions in the second direction and including a second raster line expressed by the ink, wherein, in the printing control step, the printing head prints one of the first raster lines with a predetermined number of the nozzles and prints one second raster line with a number, greater than the predetermined number, of the nozzles, and in the correction value setting step, the correction value applied to the second raster line and the correction value applied to some of the first raster lines including the first raster line adjacent to the second region are set in accordance with a printing condition that changes a concentration difference of the second raster line from the first raster lines.

DESCRIPTION OF EXEMPLARY EMBODIMENTS

Exemplary embodiments of the present disclosure are described below with reference to the accompanying drawings. Note that each of the drawings is merely illustrative for describing the exemplary embodiments. Since the drawings are illustrative, proportions and shapes may not be precise, match each other, or some may be omitted.

1. OUTLINE DESCRIPTION OF APPARATUS

Figure 1:
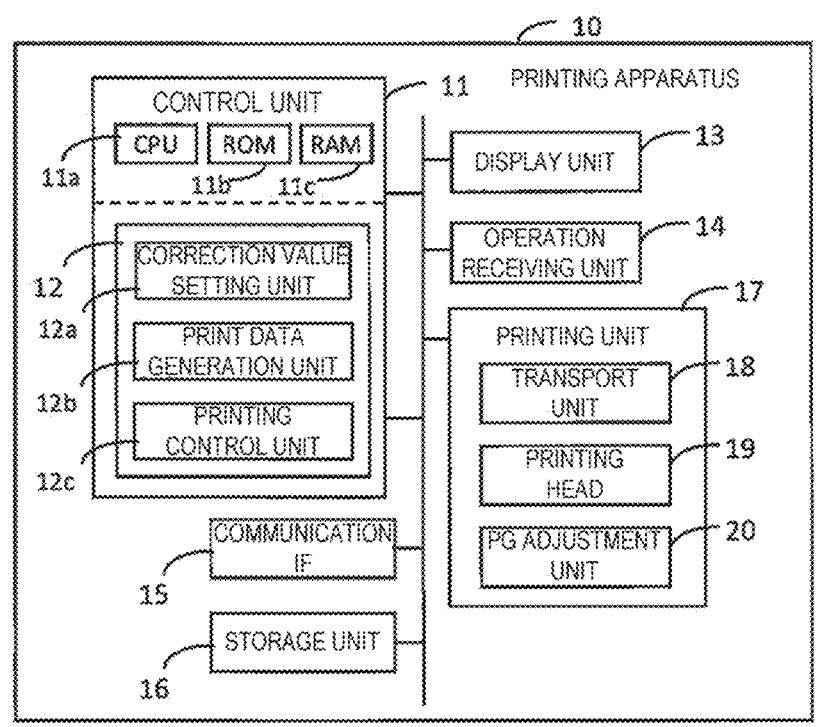
FIG. 1 is a block diagram illustrating an apparatus configuration according to the present exemplary embodiment in a simplified manner.

FIG. 1 illustrates a configuration of a printing apparatus 10 according to the present exemplary embodiment, in a simplified manner. The printing apparatus 10 includes a control unit 11, a display unit 13, an operation receiving unit 14, a communication IF 15, a storage unit 16, a printing unit 17, and the like. IF is an abbreviation for interface. The printing apparatus 10 executes a printing method.

The control unit 11 is configured to include, as a processor, one or more ICs including a CPU 11*a*, a ROM 11*b*, a RAM 11*c*, and the like, another non-volatile memory, and the like. In the control unit 11, the processor, that is, the CPU 11*a* executes arithmetic processing in accordance with a program 12 stored in the ROM 11*b*, the other memory, or the like, using the RAM 11*c* or the like as a work area. In accordance with the program 12, the control unit 11 achieves various functions such as a correction value setting unit 12*a*, a printing data generation unit 12*b*, a printing control unit 12*c*, and the like. Note that the processor is not limited to the single CPU, and a configuration may be adopted in which the processing is performed by a hardware circuit such as a plurality of CPUs, an ASIC, or the like, or a configuration may be adopted in which the CPU and the hardware circuit work in concert to perform the processing.

The display unit 13 is a device for displaying visual information, and is configured, for example, by a liquid crystal display, an organic EL display, or the like. The display unit 13 may be configured to include a display and a drive circuit for driving the display. The operation receiving unit 14 is a device for receiving an operation by a user, and is realized, for example, by a physical button, a touch panel, a mouse, a keyboard, or the like. Of course, the touch panel may be realized as a function of the display unit 13. The display unit 13 and the operation receiving unit 14 may be collectively referred to as an operation panel of the printing apparatus 10.

The display unit 13 and the operation receiving unit 14 may be part of the configuration of the printing apparatus 10, or may be peripheral devices externally coupled to the printing apparatus 10.

The communication IF 15 is a generic term for one or a plurality of IFs for coupling the printing apparatus 10 to the outside in a wired or wireless manner, in accordance with a prescribed communication protocol including a known communication standard. The control unit 11 is communicable with a personal computer, a server, a smartphone, a tablet-type terminal, or the like (not illustrated), via the communication IF 15.

The storage unit 16 is a storage device such as a hard disk drive, a solid state drive, or another memory. A part of a memory in the control unit 11 may be regarded as the storage unit 16. The storage unit 16 may be regarded as a part of the control unit 11.

The printing unit 17 includes a transport unit 18, a printing head 19, and a PG adjustment unit 20. PG is an abbreviation for paper gap. The printing apparatus 10 including the printing unit 17 corresponds to an inkjet printer that performs printing while the printing head 19 ejects a liquid such as ink. A droplet of ink ejected from the printing head 19 is also referred to as a dot.

The transport unit 18 is a device for transporting a printing medium such as sheet paper along a predetermined transport direction, and includes a roller that rotates to transport the printing medium, a motor that drives the roller, and the like.

Figure 2:
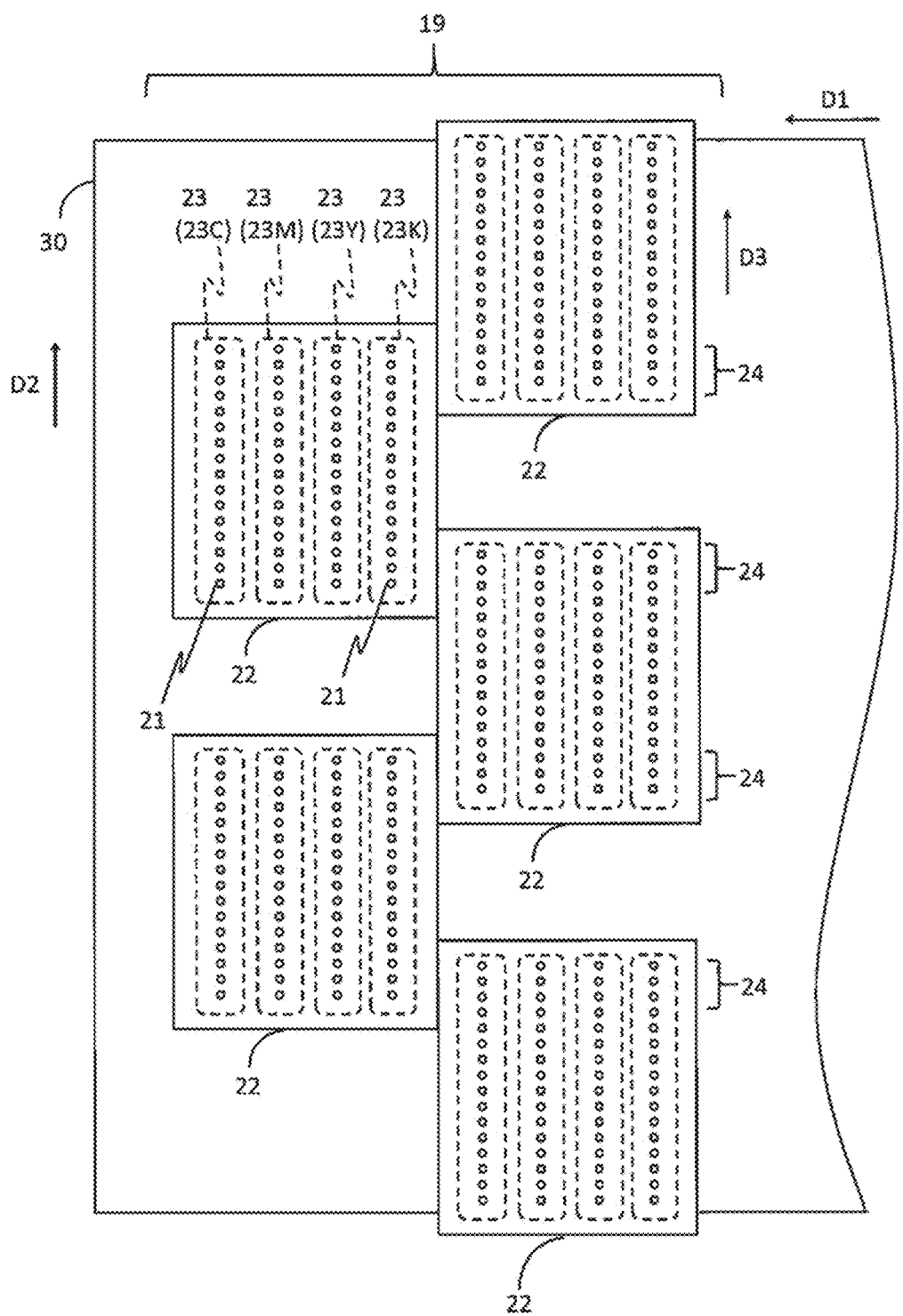
FIG. 2 is a view illustrating a relationship between a printing medium and a printing head, as seen from above in a simplified manner.

As illustrated in FIG. 2, the printing head 19 includes a plurality of nozzles 21, and each of the nozzles 21 ejects a dot onto a printing medium 30 transported by the transport unit 18. As is known, the printing apparatus 10 controls application of a drive signal to drive elements (not illustrated) of the nozzles 21, in accordance with printing data. With this, dots are ejected or prevented from being ejected from the nozzles 21. For example, the printing head 19 ejects ink of colors such as cyan (C), magenta (M), yellow (Y), and black (K) or ink of other colors, and thus printing is performed.

FIG. 2 illustrates a relationship between the printing head 19 and the printing medium 30 in a simplified manner, as seen from above. The printing head 19 may also be referred to as a recording head, a print head, a liquid ejection head, and the like. The printing medium 30 is typically sheet paper, and may be a medium formed of a material other than paper as long as printing can be performed by ejecting a liquid.

A direction D1 indicates "transport direction D1" in which the printing medium 30 is transported by the transport unit 18. Further, a direction D2 orthogonal to or substantially orthogonal to the transport direction D1 is referred to as "width direction D2" of the printing medium 30. The printing head 19 is obtained by coupling a plurality of head chips 22 to each other along a direction intersecting with the transport direction D1, and a length of the printing head 19 in a longitudinal direction is large enough to cover a width of the printing medium 30. Upstream and downstream in the transport direction D1 are simply referred to as upstream and downstream.

The plurality of head chips 22 have common structures. The number of head chips 22 that form the printing head 19 may be two or more. The head chip 22 includes a plurality of nozzle rows 23 in a configuration in which the ink of the respective colors CMYK are supplied from a liquid holding unit (not illustrated) of the printing unit 17, which is referred to as an ink cartridge, an ink tank, or the like and the ink is ejected from the nozzles 21. FIG. 2, a small white circle indicates each of the nozzles 21. In the head chips 22, each of the nozzle rows 23 is formed of the plurality of nozzles 21 aligned at a constant interval or a substantially constant interval (nozzle pitch) along the longitudinal direction of the printing head 19. The longitudinal direction of the printing head 19 is also referred to as "nozzle alignment direction D3". In the example of FIG. 2, the nozzle alignment direction D3 is parallel to the width direction D2, and is orthogonal to the transport direction D1.

The nozzle row 23 including the nozzles 21 that eject the C ink is also described as a nozzle row 23C. Similarly, the nozzle row 23 including the nozzles 21 that eject the M ink may also be described as a nozzle row 23M, the nozzle row 23 including the nozzles 21 that eject the Y ink may also be described as a nozzle row 23Y, and the nozzle row 23 including the nozzles 21 that eject the K ink may also be described as a nozzle row 23K. The nozzle rows 23C, 23M, 23Y, and 23K are at positions matching with one another in the nozzle alignment direction D3, and are aligned in a direction orthogonal to the nozzle alignment direction D3.

The example of FIG. 2 illustrates a so-called line-type inkjet printer that performs printing while the printing head 19 ejects the ink onto the printing medium 30 transported along the transport direction D1. Specifically, in the example of FIG. 2, the transport direction D1 corresponds to a relative moving direction in which the printing medium 30 and the printing head 19 move in a relative manner. Note that there may be adopted a configuration in which the printing head 19 ejects the ink onto the printing medium 30 in a rest mode while moving along the transport direction D1. Further, in the example of FIG. 2, the transport direction D1 corresponds to "first direction", and the width direction D2 corresponds to "second direction". A line expressed by dots aligned along the transport direction D1 on the printing medium 30 is referred to as "raster line".

As illustrated in FIG. 2, the coupled head chips 22 are coupled to each other so that the nozzle rows 23 thereof partially overlap with each other in the nozzle alignment direction D3. A range of the nozzles 21 in which the nozzle rows 23 of the head chips 22 partially overlap with each other is referred to as "OL portion 24. OL is an abbreviation for overlap. The head chips 22 are coupled to each other so that a position of each of the nozzles 21 of the one nozzle row 23 and a position of each of the nozzles 21 of the other nozzle row 23 in the OL portion 24 match with each other in the nozzle alignment direction D3. It can also be said that the plurality of head chips 22 described above as a whole include nozzle rows having a length over the width of the printing medium 30 for each of the ink colors C, M, Y, and K. A range of the nozzles 21, which does not correspond to the OL portion 24 in the nozzle row 23, is referred to as "normal portion" in order to distinguish the range from the OL portion 24.

In the present exemplary embodiment, ink of a predetermined color indicates ink of any one of the colors that can be ejected from the printing head 19. The two nozzle rows 23 eject ink of the predetermined color, that is, one certain color and establish a relationship of sharing the OL portion 24. One of the two nozzle rows 23 is referred to as "first nozzle row", and the other one thereof is referred to as "second nozzle row". For example, two nozzle rows 23K sharing the OL portion 24 in common establish a relationship of the first nozzle row and the second nozzle row.

Figure 3:
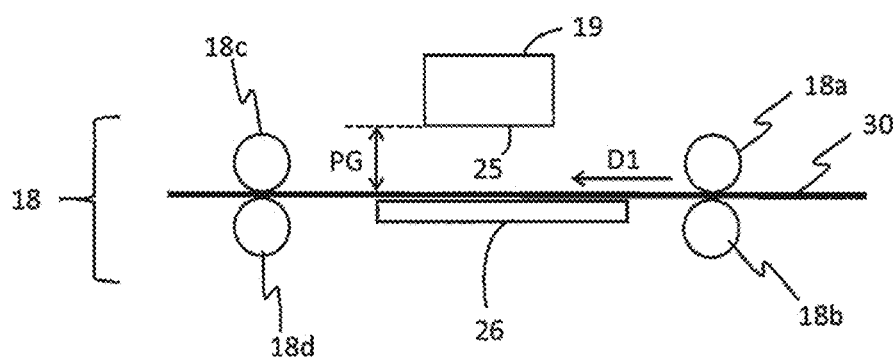
FIG. 3 is a view illustrating a relationship between the printing medium and the printing head, as seen from above in a simplified manner.

FIG. 3 illustrates a relationship between the printing head 19 and the printing medium 30 and the like, in a simplified manner, as seen toward the width direction D2. The reference symbol 26 indicates a platen 26 being a part of the transport path of the printing medium 30. The platen 26 supports the transported printing medium 30 from below.

A first roller pair formed of a roller 18a and a roller 18b is arranged upstream of the printing head 19. Further, a second roller pair formed of a roller 18c and a roller 18d is arranged downstream of the printing head 19. Those roller pairs are parts of the transport unit 18. The roller pair rotates while nipping the printing medium 30 between the rollers forming the pair, and thus transports the printing medium 30 downstream. As a matter of course, the rollers of the transport unit 18 are not limited to those in illustration. Further, a device with which the transport unit 18 transports the printing medium 30 may be a belt, table, or the like that is movable while placing the printing medium 30 thereon.

The printing head 19 is supported above at a position facing the platen 26. The lower surface of the printing head 19 that faces the platen 26 is a nozzle surface 25 in which the nozzles 21 are opened, and each of the nozzles 21 opened in the nozzle surface 25 ejects the ink onto the printing medium 30 supported by the platen 26. FIG. 3 illustrates PG being a distance between the printing medium 30 and the printing head 19. PG may be referred to as a head height that indicates height of the printing head 19 from the printing medium 30.

The PG adjustment unit 20 includes a motor, a support mechanism, or the like that vertically moves the printing head 19. The PG adjustment unit 20 moves the printing head 19 in a direction away from the platen 26 or in a direction approaching the platen 26, and thus adjusts PG as a result. Note that the printing head 19 may be provided with a ranging sensor capable of measuring PG, and the control unit 11 may cause the PG adjustment unit 20 to adjust PG accurately while monitoring the measurement result obtained by the ranging sensor. Further, the ranging sensor may measure a distance from the printing head 19 to the platen 26, and the control unit 11 may grasp PG by subtracting, from the measurement result, a numerical value that is obtained as the thickness of the printing medium 30.

The configuration including the PG adjustment unit 20 for adjusting PG is not necessary in the present exemplary embodiment. Particularly, the configuration may be omitted in a first exemplary embodiment described below.

As it can be understood from the positional relationship between the normal portion and the OL portion 24, which is described in FIG. 2, the printing control unit 12c of the control unit 11 causes the printing head 19 to print "first region" and "second region" on the printing medium 30. In the first region, a plurality of "first raster lines" expressed by the ink of the predetermined color are aligned in the width direction D2. In the second region, which is sandwiched between the first regions in the width direction D2, "second raster lines" expressed by the ink of the predetermined color are aligned in the width direction D2. The first region corresponds to "non-OL region", and the second region corresponds to "OL region". In other words, the first raster lines are printed by the nozzles 21 in the normal portion, and the second raster lines are printed by the nozzles 21 in the OL portion 24. One first raster line is printed by using one nozzle 21 in the normal portion. Meanwhile, one second raster line is OL-printed by using two nozzles 21 in the OL portion 24, in other words, the nozzle 21 belonging to the first nozzle row and the nozzles 21 belonging to the second nozzle row. The number of nozzles used for printing one raster line in the first region is different from that in the second region. Thus, concentration of the printing result in the second region on the printing medium 30 is higher or lower than that in the first region, which may be visually recognized as concentration unevenness in a streak form.

Printing in the second region is performed by using the nozzle 21 in the first nozzle row and the nozzle 21 in the second nozzle row with substantially the same ratio, in other words, a ratio of 50% to 50%. In view of a unit of the second raster line forming the second region, a usage ratio of the nozzle 21 in the first nozzle row and the nozzle 21 in the second nozzle row is not always a ratio of 50% to 50%. For example, a certain second raster line is printed with the usage ratio of the nozzle 21 in the first nozzle row and the nozzle 21 in the second nozzle row, which is 10% to 90%. Another second raster line is printed with the usage ratio of the nozzle 21 in the first nozzle row and the nozzle 21 in the second nozzle row, which is 90% to 10%. Further, for example, a certain second raster line is printed with the usage ratio of the nozzle 21 in the first nozzle row and the nozzle 21 in the second nozzle row, which is 30% to 70%. Another second raster line is printed with the usage ratio of the nozzle 21 in the first nozzle row and the nozzle 21 in the second nozzle row, which is 70% to 30%. Specifically, the usage ratio of the nozzle 21 in the first nozzle row and the nozzle 21 in the second nozzle row may be substantially the same in the second region as a whole. The usage ratio of the nozzles 21 referred herein is a value obtained by assuming that the usage ratio of the nozzles 21 is 100% when one nozzle 21 ejects dots corresponding to all pixels expressing one raster line in image data.

The printing apparatus 10 may be realized by a single printer, or may be realized by a plurality of communicatively coupled devices. For example, the printing apparatus 10 may be realized by a system including an information processing device including the control unit 11 and the storage unit 16 and a printer corresponding to the printing unit 17.

Description is given below while focusing on printing with ink of one of the plurality of colors ejected by the printing head 19, that is, the ink K, for example. However, the description given below is similarly applied to printing with ink of the other colors.

2. FIRST EXEMPLARY EMBODIMENT

Figure 4:
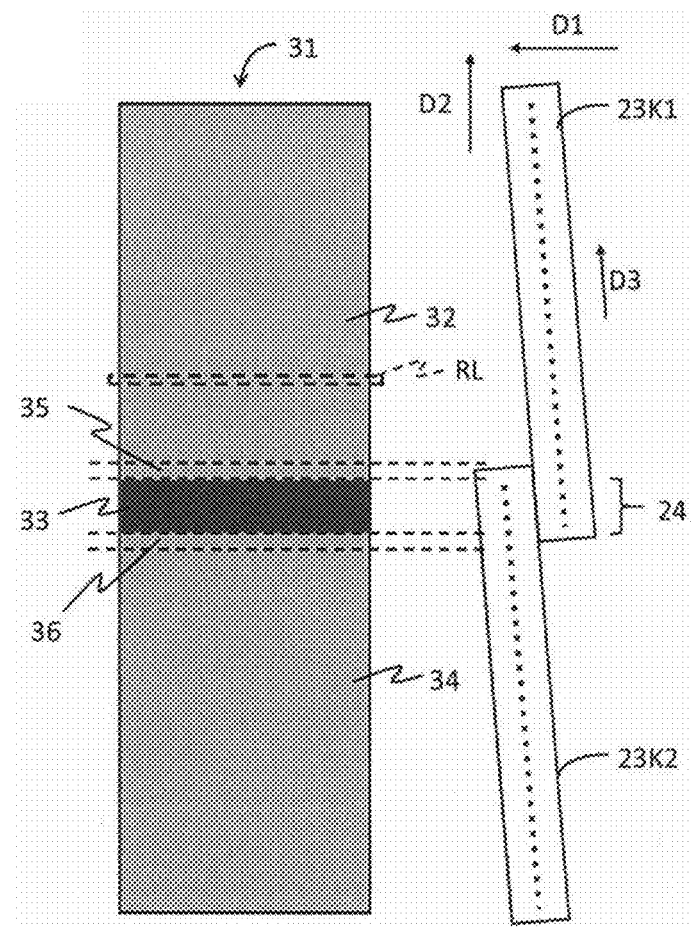
FIG. 4 is a view illustrating a pair of a first nozzle row and a second nozzle row, as seen from the same viewpoint as in FIG. 2.

FIG. 4 is a view illustrating inclination of the printing head 19, and illustrates a pair of the first nozzle row and the second nozzle row, as seen from the same viewpoint as in FIG. 2. Note that, in FIG. 4, each of the nozzles 21 in the nozzle row is indicated with a black point in a simplified manner. FIG. 4 illustrates a nozzle rows 23K1 being a nozzle row 23K belonging to a certain head chip 22 and a nozzle row 23K2 being a nozzle row 23K in another head chip 22 in the printing head 19. The nozzle row 23K1 and the nozzle row 23K2 share the OL portion 24 in common, and correspond to one pair of the first nozzle row and the second nozzle row. In the present exemplary embodiment, inclination of the nozzle alignment direction D3 with respect to the width direction D2 is regarded as inclination of the printing head 19. Inclination of the printing head 19 is also referred to as "head inclination" below.

In the example of FIG. 2, the head inclination is 0 degree. In the example of FIG. 4, the nozzle alignment direction D3 is slightly inclined leftward with respect to the width direction D2, and the head inclination is not 0 degree. The printing head 19 may be inclined with respect to the width direction D2 due to a mounting angle error at the time of assembling each printing unit 17, aging, an unexpected external force, or the like. As a matter of course, unlike the example of FIG. 4, the nozzle alignment direction D3 may be inclined rightward with respect to the width direction D2. For convenience, leftward inclination of the nozzle alignment direction D3 with respect to the width direction D2 as in FIG. 4 may be regarded as positive inclination, and opposite inclination being rightward inclination may be regarded as negative inclination.

FIG. 4 also illustrates a part of printing image 31 printed on the printing medium 30 by the first nozzle row and the second nozzle row. A linear region that is indicated with the reference symbol RL and extends along the transport direction D1 is one raster line RL. In the example of FIG. 4, the printing image 31 includes a first region 32 that is printed by the nozzles 21 in the normal portion of the nozzle row 23K1, a second region 33 that is OL-printed by the nozzles 21 in the OL portion 24 of the nozzle row 23K1 and the nozzle row 23K2, and a first region 34 that is printed by the nozzles 21 in the normal portion of the nozzle row 23K2. Further, a region that is a part of the first region 32 and is adjacent to the second region 33 and a region that is a part of the first region 34 and is adjacent to the second region 33 are referred to as an adjacent region 35 and an adjacent region 36, respectively.

In the second region 33 in which each raster line is OL-printed by using the two nozzles 21, an ink coating ratio on the printing medium 30 is changed in accordance with the head inclination. Therefore, when the head inclination differs, a concentration difference of the second region 33 from the first regions 32 and 34 differs. For example, when rightward inclination as illustrated in FIG. 4 is larger, concentration of the second region 33 is darker than the first regions 32 and 34.

In the present exemplary embodiment, JP-A-2018-149690 given above may be referred to as appropriate. For description regarding change in concentration difference of the second region (OL region) from the first region (non-OL region) in accordance with the head inclination, description on FIG. 3 and FIG. 4 in JP-A-2018-149690 given above may be referred to.

In the first exemplary embodiment, description is given by assuming that "the printing condition that affects a concentration difference of the second raster line from the first raster line" is the head inclination. Further, in the first exemplary embodiment, it is assumed that PG referred in a second exemplary embodiment is constant, and description is given without considering an influence of PG.

Figure 5:
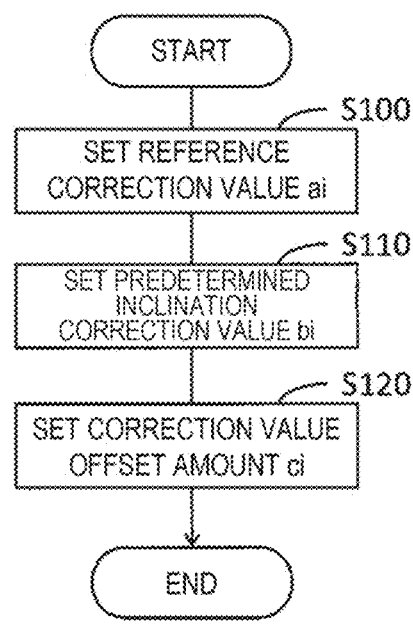
FIG. 5 is a flowchart illustrating correction value preparation processing in a first exemplary embodiment.

FIG. 5 illustrates, using a flowchart, correction value preparation processing executed by the control unit 11 in accordance with the program 12. A correction value is information for correcting concentration for each raster line. As described later with reference to FIG. 6, an ink amount for each raster line is corrected. With this, concentration variation among the respective raster lines in the printing result can be suppressed.

In Step S100, the correction value setting unit 12a sets "reference correction value ai". The reference correction value ai indicates a correction value to be adopted when the head inclination has a reference value in designing. Here, the reference value is the head inclination=0 degree. The reference correction value ai may be set in the following manner, for example. First, at the stage before shipping the printing apparatus 10 as a product, the printing unit 17 is mounted with the head inclination of 0 degree as accurately as possible. In this state, the correction value setting unit 12a causes the printing head 19 to print a test image on the printing medium 30 with the ink K, based on test image data indicating predetermined concentration, for example, concentration of 50%. Then, a concentration meter is used to measure concentration for all the raster lines including both the first region and the second region as a printing result of the test image, and average concentration Ak0 of the measured concentration is obtained.

Subsequently, the correction value setting unit 12a sets the reference correction value ai for adjusting a measured concentration k0i of a target raster line to the average concentration Ak0, with respect to the target raster line. The variable i is a variable for identifying each of all the raster lines including the first region and the second region, and the numerical value range is from 1 to the total number of raster lines. The variable i is also referred to as a raster number indicating a number expressing a raster line. For example, the reference correction value ai can be regarded as a rate (Ak0−k0i)/Ak0 of a difference value Ak0−k0i with respect to the average concentration Ak0. Further, the correction value setting unit 12a causes the storage unit 16 to store the reference correction value ai that is set for each raster line. In accordance with a magnitude relationship between the average concentration Ak0 and the measured concentration k0i, the reference correction value ai may be a positive value or a negative value. When a correction value for a certain raster line is a positive value, concentration of the raster line in the printing result is relatively light. Thus, the positive value indicates that a correction value for darkening the concentration is obtained. In contrast, when a correction value for a certain raster line is a negative value, concentration of the raster line in the printing result is relatively dark. Thus, the negative value indicates that a correction value for lightening the concentration is obtained.

In Step S110, the correction value setting unit 12a sets "predetermined inclination correction value bi". The predetermined inclination correction value bi indicates a correction value to be adopted when the head inclination is predetermined inclination α different from the reference value. As one example, α=+1 degree. The predetermined inclination correction value bi can be set similarly to the reference correction value ai. At the stage before shipping the printing apparatus 10 as a product, a state being the head inclination=α is obtained. In this state, the correction value setting unit 12a causes the printing head 19 to print the test image with the ink K on the printing medium 30, and obtains average concentration Akα of measured concentration for all the raster lines both in the first region and the second region in the printing result of the test image. Subsequently, the correction value setting unit 12a sets the predetermined inclination correction value bi for adjusting a measured concentration kai of a target raster line to the average concentration Akα, with respect to the target raster line. For example, the predetermined inclination correction value bi can be regarded as a rate (Akα−kαi)/Akα of a difference value Akα−kαi with respect to the average concentration Akα. Further, the correction value setting unit 12a causes the storage unit 16 to store the predetermined inclination correction value bi that is set for each raster line. As a matter of course, in accordance with a magnitude relationship between the average concentration Akα and the measured concentration kαi, the predetermined inclination correction value bi may be also a positive value or a negative value.

In Step S120, the correction value setting unit 12a sets "correction value offset amount ci" for the second raster lines forming the second region and some of the first raster lines including adjacent raster lines. "Adjacent raster lines" indicate raster lines being the first raster lines adjacent to the second region. In the following description, some of the first raster lines including adjacent raster lines are simply referred to as "some of the first raster lines".

The correction value offset amount ci can be obtained from Expression (1) given below.

$$ci = bi - ai \quad (1)$$

In other words, a difference value between the predetermined inclination correction value bi and the reference correction value ai for the common raster number (variable i) is the correction value offset amount ci. The correction value setting unit 12a sets the correction value offset amount ci for each of all the second raster lines in the second region. Meanwhile, the correction value setting unit 12a sets the correction value offset amount ci for each of some of the first raster lines in the first region. Further, the correction value setting unit 12a causes the storage unit 16 to store the correction value offset amount ci that is set.

With reference to FIG. 4, a specific example of Step S120 is described. As one example, it is assumed that each of the nozzle row 23K1 and the nozzle row 23K2 includes hundred nozzles 21 and five nozzles 21 at each end are the overlapping nozzles. In this case, five second raster lines that are OL-printed by ten nozzles 21 in the OL portion 24 form the second region 33. Therefore, in Step S120, the correction value setting unit 12a sets the correction value offset amount ci for each of those five second raster lines. It can be said that the correction value offset amount ci of the second raster line is a correction value for correcting a concentration change of the second raster line in the printing result in accordance with a change of the head inclination from the reference value to the predetermined inclination α.

Further, in Step S120, the correction value setting unit 12a sets the correction value offset amount ci for each of the first raster lines forming the adjacent regions 35 and 36. In other words, the adjacent regions 35 and 36 are some of the first raster lines. FIG. 4 illustrates an example in which each of the adjacent regions 35 and 36 includes the specific number (two or more) of first raster lines. However, each of the adjacent regions 35 and 36 may include only adjacent raster lines.

Here, concentration of the second region in the printing result differs when the head inclination differs. Thus, the predetermined inclination correction value bi and the reference correction value ai are different values. Basically, the correction value offset amount ci is not 0. In other words, the correction value offset amount ci of the second raster line is not 0. Meanwhile, concentration of the first region in the printing result is hardly affected by the head inclination. Thus, it is expected that the predetermined inclination correction value bi and the reference correction value ai are the same value and the correction value offset amount ci is 0. In other words, the correction value offset amount ci of the first raster line is more likely to be 0 as compared to the correction value offset amount ci of the second raster line.

In a case in which the correction value offset amount ci of the first raster lines forming the adjacent regions 35 and 36 is calculated, even when the calculation result is 0, the correction value setting unit 12a sets the correction value offset amount ci other than 0. For example, the correction value setting unit 12a may set a value equivalent to the correction value offset amount ci of the second raster line, which is adjacent to the adjacent region 35 among the second raster lines forming the second region 33, or a value obtained by subjecting the above-mentioned value to predetermined correction, to the correction value offset amount ci of the first raster lines forming the adjacent region 35. Similarly, the correction value setting unit 12a may set a value equivalent to the correction value offset amount ci of the second raster line, which is adjacent to the adjacent region 36 among the second raster lines forming the second region 33, or a value obtained by subjecting the above-mentioned value to predetermined correction, to the correction value offset amount ci of the first raster lines forming the adjacent region 36.

Here, the correction value setting unit 12a terminates the flowchart for the correction value preparation processing.

Note that, in Step S120, the predetermined inclination correction value bi that is required for setting the correction value offset amount ci is the predetermined inclination correction value bi of the second raster line and the predetermined inclination correction value bi of some of the first raster lines. Therefore, in Step S110, the correction value setting unit 12a is not required to set the predetermined inclination correction value bi for the first raster line for which the correction value offset amount ci is not set in Step S120.

Figure 6:
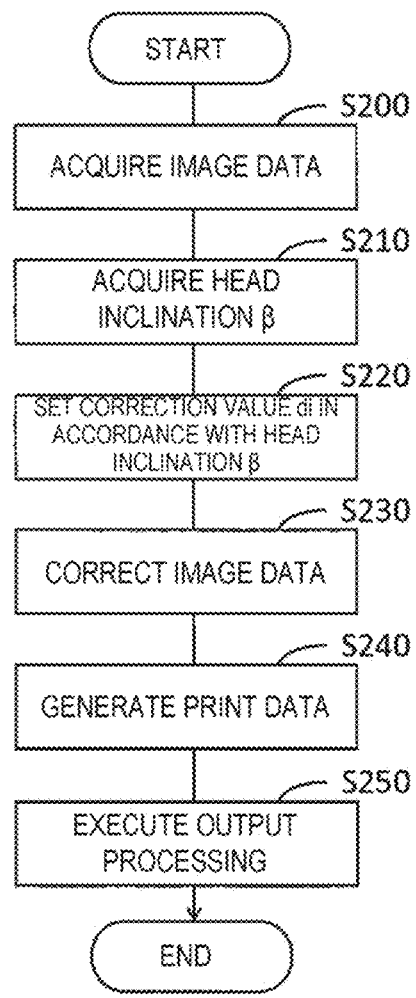
FIG. 6 is a flowchart illustrating printing control processing in the first exemplary embodiment.

FIG. 6 illustrates, using a flowchart, printing control processing executed by the control unit 11 in accordance with the program 12. The printing control processing is executed in a state execution of the correction value preparation processing is completed. In the printing control processing, correction of image data using a correction value is also executed.

In Step S200, the printing data generation unit 12b acquires image data expressing an image of a printing target. For example, a user operates the operation receiving unit 14 while visually recognizing a UI screen displayed on the display unit 13. With this, an image being a printing target can be freely selected. UI is an abbreviation for user interface. The printing data generation unit 12b acquires the image data relating to the image selected by the user, from a predetermined storage source.

In the present exemplary embodiment, the printing data generation unit 12b executes correction using a correction value with respect to the image data in an ink color system used by the printing head 19 for printing. In view of this, as required, the printing data generation unit 12b executes color conversion for the color system of the acquired image data for correction. For example, color conversion can be executed with reference to a color conversion look-up table for converting a color system. In Step S200 as described above, as a result, the printing data generation unit 12b acquires CMYK image data in a bitmap format in which each pixel has a gray-scale value for each of C, M, Y, and K. For example, the gray-scale value is a value indicated with 256 scales from 0 to 255, and is also referred to as an ink amount. Further, the ink amount indicates concentration for each pixel.

In Step S210, the control unit 11 acquires the head inclination. The head inclination acquired in Step S210 is described as "head inclination β". The control unit 11 is only required to acquire current head inclination β, and an acquisition method is not particularly limited. For example, the control unit 11 causes the printing head 19 to print a pattern image such as a ruled line for detecting the head inclination β. A user who visually recognizes inclination of the ruled line in the printing result of the pattern image can input the head inclination β via the operation receiving unit 14. Alternatively, a reading device automatically may read the printing result of the pattern image, and the control unit 11 may calculate the head inclination β by analyzing the read image data acquired from the reading device. Alternatively, the printing unit 17 may include a sensor for detecting the head inclination β, and the control unit 11 may acquire the head inclination β through input of the detection result from the sensor. As a matter of course, description regarding an inclination angular acquisition unit in JP-A-2018-149690 given above may be adopted for acquiring the head inclination β. Further, timing at which Step S210 is executed may be before Step S200.

In Step S220, the correction value setting unit 12a sets "correction value di" for the second raster line and some of the first raster lines that form the second region in accordance with the head inclination β, by using the information that is stored in the storage unit 16 in the correction value preparation processing. The correction value di is not required to be set for the first raster lines other than some of the first raster lines. Step S220 corresponds at least a part of "correction value setting step". When the reference correction value ai, the correction value offset amount ci, and the head inclination β are given, the correction value di for correcting concentration of the second raster line with the head inclination β can be calculated with Expression (2) given below, for example.

$$di=ai+(\beta/\alpha)ci \qquad (2)$$

For example, when α=+1 degree and β=+2 degrees, di=ai+2ci according to Expression (2). When ci=bi−ai, Expression (2) can be given as in Expression (3) given below.

$$di=ai+(\beta/\alpha)(bi-ai) \qquad (3)$$

As a matter of course, When β=α, di=bi. Further, when 62 =0 degree, di=ai.

When the reference correction value ai and the predetermined inclination correction value bi are given, the correction value offset amount ci can be calculated. Thus, Step S120 in FIG. 5 may not be executed in the correction value preparation processing, but may be executed at the timing of Step S220.

Further, instead of the ratio of the head inclination β with respect to the predetermined inclination α itself, a coefficient for multiplying the correction value offset amount ci may be a function f (β/α) in accordance with the rate β/α as in Expression (4) given below.

$$di=ai+f(\beta/\alpha)\times ci \qquad (4)$$

Any one of Expressions (2), (3)m and (4) may be used. Here, it is assumed that Expression (2) is used. The specific example is described while referring back to FIG. 4 again. In Step S220, the correction value setting unit 12a sets the correction value di for each of the second raster lines forming the second region 33. Further, the correction value setting unit 12a sets for each of the first raster lines forming the adjacent regions 35 and 36.

Figure 7:
FIG. 7 is a view illustrating processing for setting a correction value in accordance with head inclination.

FIG. 7 is a view illustrating processing for setting the correction value di for each of the raster lines RL in accordance with the head inclination β in Step S220. In FIG. 7, the raster lines RL, the correction values ai and bi, and the correction value offset amount ci are identified by using specific raster numbers (variable i). In the example of FIG. 7, five raster lines being raster lines RL96 to RL 100 correspond to the second raster lines, in other words, the second region 33. Further, in the example of FIG. 7, four raster lines being the raster lines RL94, RL95, RL101, and RL 102 correspond some of the first raster lines. The raster lines RL94 and RL95 correspond to the adjacent region 35, and the raster lines RL101 and RL102 correspond to the adjacent region 36. The raster lines RL95 and RL101 correspond to adjacent raster lines. According to the example of FIG. 7, the correction value setting unit 12a sets the correction value di for each of the raster lines RL94 to RL102. For example, the correction value di for the raster lines RL96 with i=96 can be expressed as a96+(β/α)×c96.

In Step S230, the printing data generation unit 12b corrects image data with a correction value for each raster line. The image data contains raster lines formed of a plurality of pixels aligned in accordance with the transport direction D1, as data. The raster lines in the image data may be referred to as raster line data. The printing data generation unit 12b corrects an ink amount of the ink K for each of pixels forming a certain raster line in the image data, with a correction value for the ink K of the raster line.

The printing data generation unit 12b is only required to correct the first raster line that does not correspond to some of the first raster lines in the image data, by using the reference correction value ai for each raster line, is set in the correction value preparation processing. As a matter of course, some of the first raster lines and the second raster line in the image data are corrected by using the correction value di for each of the raster lines, which is set in Step S220. For example, the printing data generation unit 12b can obtain a gray-scale value Q after correcting a gray-scale P by Expression (5) given below when a gray-scale value indicating an ink amount of the ink K for a certain pixel is P, and a correction value for the ink K of a raster line to which the pixel belongs is Hi.

$$Q=P+Hi\times P \quad (5)$$

The correction value Hi is substituted with the correction value di or the correction value ai, in accordance with a raster line to which a pixel being a correction target belongs. As a matter of course, in Expression (5), a coefficient or a constant value may further be used for optimized correction. Such correction is executed for all the pixels in the image data. As a result of this, for a raster line with concentration that is relatively light in the printing result without concentration, correction is executed so that the ink amount is increased. In contrast, for a raster line with concentration that is relatively dark in the printing result without correction, correction is executed so that the ink amount is reduced.

In Step S240, the printing data generation unit 12b generates printing data by converting the image data after correction in Step S230. Specifically, the printing data generation unit 12b converts the image data after correction into the binary image data by executing halftone processing. The binary image data defines ink ejection (dot-on) or ink non-ejection (dot-off) for each of C, M, Y, and K for each pixel. As a matter of course, the printing data is no limited to the binary image data, and may be multi-level image data that defines dot-on or dot-off of any one of dots having a plurality of sizes such as large, medium, small. Step S230 and Step S240 correspond to "printing data generation step". Note that "printing data" is merely a name of data after Step S240, and hence this may continuously be referred to as image data.

In Step S250, the printing control unit 12c executes output processing for causing the printing unit 17 to perform printing based on the printing data generated in Step S240. In other words, the printing control unit 12c arrays pixel data for each raster line in the printing data in the order of usage of the respective nozzles 21 of the printing head 19, allocates the pixel data to the respective nozzles 21, and transfers the pixel data to the printing head 19. Further, the printing control unit 12c causes the transport unit 18 to start transporting the printing medium 30. As a result, when the printing head 19 and the transport unit 18 are driven in the printing unit 17, the image expressed in the printing data is printed on the printing medium 30. As a matter of course, in this case, as described with reference to FIG. 2 and the like, the first raster lines are printed by the nozzles 21 in the normal portion, and the second raster lines are printed by the nozzles 21 in the OL portion 24 on the printing medium 30. Step S250 corresponds to "printing control step" for causing the printing head 19 to print the first region and the second region on the printing medium 30, based on the image data after correction. The first region includes the plurality of first raster lines aligned in the second direction intersecting with the first direction, and the second region, which is sandwiched between the first regions in the second direction, includes the second raster line. The flowchart for the printing control processing ends here.

3. SECOND EXEMPLARY EMBODIMENT

Next, a second exemplary embodiment is described. As described above, the PG adjustment unit 20 is capable of adjusting PG. When PG differs, a flying time differs. The flying time is a time from a time point when a dot is ejected from the printing head 19 to a time point when the dot lands on the printing medium 30. Thus, an extent to which an airflow affects the flying dot differs. Therefore, in the second region 33 in which each raster line is OL-printed by using the two nozzles 21, an ink coating ratio on the printing medium 30 is more likely to be changed in accordance with PG. Therefore, when PG differs, a concentration difference of the second region 33 from the first regions 32 and 34 differs.

For example, even when printing is likely to be performed darker in concentration in the second region 33 as compared to the first regions 32 and 34, the second region 33 is lighter in concentration as PG is increased. As a result, a concentration difference of the second region 33 from the first regions 32 and 34 may be reduced in some cases. In view of this, in the second exemplary embodiment, description is given by assuming that "the printing condition that affects a concentration difference of the second raster line from the first raster line" is PG. In the second exemplary embodiment, it is assumed that the head inclination is constant, and description is given without considering an influence of the head inclination. Further, in the second exemplary embodiment, description shared in common with the first exemplary embodiment is omitted as appropriate.

Figure 8:
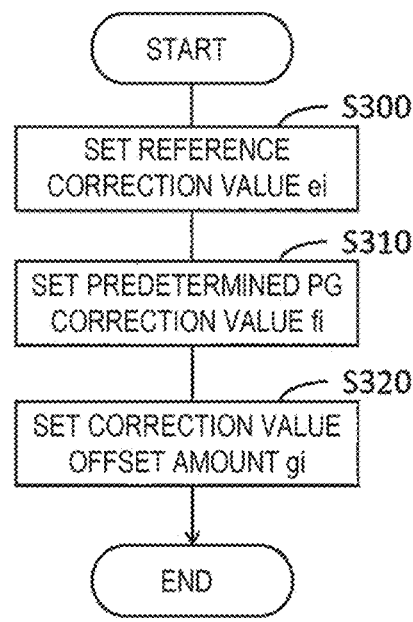
FIG. 8 is a flowchart illustrating correction value preparation processing in a second exemplary embodiment.

FIG. 8 illustrates, using a flowchart, the correction value preparation processing in the second exemplary embodiment.

Figure 9:
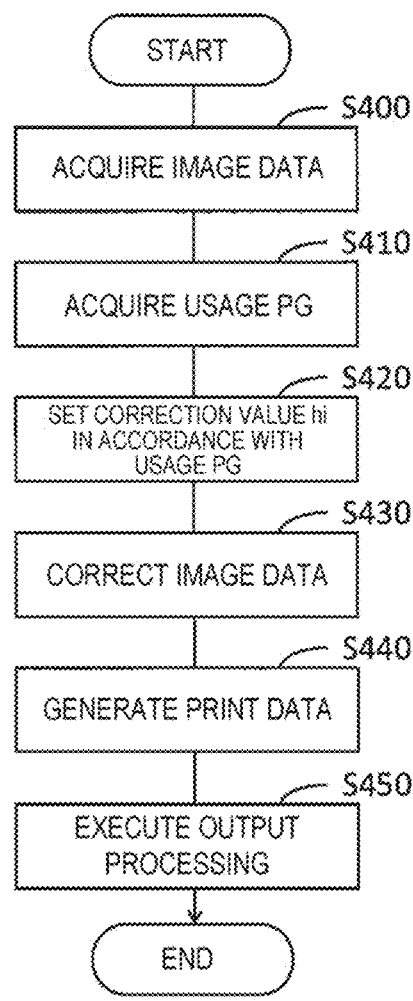
FIG. 9 is a flowchart illustrating printing control processing in the second exemplary embodiment.

FIG. 9 illustrates, using a flowchart, the printing control processing in the second exemplary embodiment.

In the second exemplary embodiment, the head inclination in the first exemplary embodiment is replaced with "PG", the reference correction value ai, the predetermined inclination correction value bi, the correction value offset amount ci, the correction value di, the inclination α, and the inclination β in the first exemplary embodiment are replaced with "reference correction value ei", "predetermined PG correction value fi", "correction value offset amount gi", "correction value hi", "pg 1", and "pg 2", respectively. With this, overall understanding can be achieved.

In Step S300 in FIG. 8, the correction value setting unit 12a sets "reference correction value ei". The reference correction value ei indicates a correction value to be adopted when PG has the reference value. Any value may be freely given as the reference value of PG. However, as an example, a minimum value that can be given as Pg is regarded as the reference value. In the following description, the reference value of PG is indicated with "pg 0". The reference correction value ei may be set according to the first exemplary embodiment. In other words, at the stage before shipping the printing apparatus 10 as a product, a state being PG=pg 0 is obtained. In this state, the correction value setting unit 12a causes the printing head 19 to print the test image with the ink K on the printing medium 30, and obtains average concentration of measured concentration for all the raster lines both in the first region and the second region in the printing result of the test image. Subsequently, the correction value setting unit 12a sets the reference correction value ei for adjusting a measured concentration of a target raster line to the average concentration, with respect to the target raster line. In other words, the reference correction value ei of the target raster line may be a rate of a difference value between the average concentration and the measured concentration of the target raster line, with respect to the average concentration. the correction value setting unit 12a causes the storage unit 16 to store the reference correction value ei that is thus set for each raster line.

In Step S310, the correction value setting unit 12a sets "predetermined PG correction value fi". The predetermined PG correction value fi indicates a correction value to be adopted with PG is predetermined PG different from the reference value pg 0. In the following description, predetermined PG is indicated with "pg 1". Here, pg 1>pg 0. The predetermined PG correction value fi may be set according to the description given above. In other words, at the stage before shipping the printing apparatus 10 as a product, a state being PG=pg 1 is obtained. In this state, the correction value setting unit 12a causes the printing head 19 to print the test image with the ink K on the printing medium 30, and obtains average concentration of measured concentration for all the raster lines both in the first region and the second region in the printing result of the test image. Subsequently, the correction value setting unit 12a sets the predetermined PG correction value fi for adjusting a measured concentration of a target raster line to the average concentration, with respect to the target raster line. the predetermined PG correction value fi of the raster line may be a rate of a difference value between the average concentration and the measured concentration of the target raster line, with respect to the average concentration. The correction value setting unit 12a causes the storage unit 16 to store the predetermined PG correction value fi that is thus set for each raster line.

In Step S320, the correction value setting unit 12a sets "correction value offset amount gi" for the second raster line and some of the first raster lines that form the second region. The correction value offset amount gi can be obtained from gi=fi−ei. The correction value setting unit 12a causes the storage unit 16 to store the correction value offset amount gi that is set. As understood from the description given above, it can be said that the correction value offset amount gi of the second raster line is a correction value for correcting a concentration change of the second raster line in the printing result in accordance with a change of PG from the reference value pg0 to pg1 being the predetermined value.

Concentration of the second region in the printing result differs when PG differs. Thus, the predetermined PG correction value fi and the reference correction value ei are different values. Basically, the correction value offset amount gi is not 0. In other words, the correction value offset amount ci of the second raster line is not 0. Meanwhile, concentration of the first region in the printing result is not affected by PG as much as the second region. Thus, it is expected that the predetermined PG correction value fi and the reference correction value ei are the same value and the correction value offset amount gi is 0. Similarly to the first exemplary embodiment, in a case in which the correction value offset amount gi for some of the first raster lines is calculated, even when the calculation result is 0, the correction value setting unit 12a sets the correction value offset amount gi other than 0. Here, the correction value setting unit 12a terminates the flowchart for the correction value preparation processing.

Step S400 in FIG. 9 is similar to Step S200 in FIG. 6.

In Step S410, the control unit 11 acquires PG. PG acquired in Step S410 is indicated with "usage PG". The control unit 11 is only required to acquire usage PG, and an acquisition method is not particularly limited. A user sets PG to be used for printing via the operation receiving unit 14, which is selected from a plurality of PGs, and causes the PG adjustment unit 20 to adjust PG. In this configuration, the control unit 11 is only required to acquire PG of the current setting as usage PG. Further, as described above, when the printing unit 17 includes a ranging sensor capable of measuring PG, the control unit 11 may acquire usage PG, based on the measurement result of the sensor. In the following description, usage PG acquired in Step S410 is indicated with "pg 2".

In Step S420, the correction value setting unit 12a sets "correction value hi" for the second raster line and some of the first raster lines that form the second region, in accordance with usage PG, by using the information that is stored in the storage unit 16 in the correction value preparation processing. When the reference correction value ei, the correction value offset amount gi, and usage PG are given, the correction value hi for correcting concentration of the second raster line with usage PG can be calculated. According to the first exemplary embodiment, the correction value setting unit 12a may calculate the correction value hi from hi=ei+(pg 2/pg 1)gi, for example. When pg 2=pg 1, hi=fi. Note that, when pg 2=pg 0, the correction value setting unit 12a regards pg 2/pg 1 as 0. Thus, hi=ei.

Figure 10:
FIG. 10 is a view illustrating processing for setting a correction value in accordance with PG.

FIG. 10 is a view illustrating processing for the correction value hi for each of the raster lines RL in accordance with pg 2 in Step S420. The perspective in FIG. 10 is the same as the perspective in FIG. 7. In other words, the raster lines RL96 to RL 100 correspond to the second raster lines, and the raster lines RL94, RL95, RL101, and RL102 correspond to some of the first raster lines. According to the example of FIG. 10, the correction value setting unit 12a sets the correction value hi for each of the raster lines RL94 to RL102. For example, the concentration value hi for the raster line RL 96 with i=96 can be expressed as e96+(pg 2/pg 1)×g96.

Similarly to Step S230, in Step S430, the printing data generation unit 12b corrects image data with a correction value for each raster line. The printing data generation unit 12b is only required to correct the first raster line that does not correspond to some of the first raster lines in the image data, by using the reference correction value ei for each raster line, is set in the correction value preparation processing. As a matter of course, some of the first raster lines and the second raster line in the image data are corrected by using the correction value hi for each of the raster lines, which is set in Step S420.

Step S440 and Step S450 are similar to Step S240 and Step S250.

4. CONCLUSION

As described above, according to the present exemplary embodiment, the printing apparatus 10 includes the printing head 19, the correction value setting unit 12a, the printing data generation unit 12b, and the printing control unit 12c. The printing head 19 includes the plurality of nozzles 21 that eject the ink of the predetermined color. The correction value setting unit 12a sets a correction value for each of raster lines for correcting concentration of each raster line expressed by aligning dots of the ink along the first direction. The printing data generation unit 12b corrects the image data with the correction value for each raster line. The printing control unit 12c causes the printing head 19 to print the first region and the second region on the printing medium 30, based on the image data after correction. The first region includes the plurality of first raster lines that are expressed by the ink and are aligned in the second direction intersecting with the first direction. The second region, which is sandwiched between the first regions in the second direction, includes the second raster line expressed by the ink. The printing control unit 12c causes the printing head 19 to print one first raster line with the predetermined number of nozzles 21 and to print one second raster line with the number of nozzles 21 more than the predetermined number. The correction value setting unit 12a sets a correction value applied to the second raster line and a correction value applied to some of the first raster lines including the first raster lines adjacent to the second region, in accordance with the printing condition that changes a concentration difference of the second raster line from the first raster line.

According to the above-mentioned configuration, the correction value applied to the second raster line is set in accordance with the printing condition that changes a concentration difference of the second raster line from the first raster line. Thus, when printing is performed under the printing condition, concentration of the second raster line can be corrected as appropriate, and concentration unevenness in a streak form can be suppressed in the printing result. Further, in the above-mentioned configuration, the correction value applied to "some of the first raster lines" is set in accordance with the printing condition. As a result, correction for concentration of the second raster line is complemented by correction for concentration of the adjacent first raster lines or the like. With this, the second raster line can be prevented more appropriately from appearing as concentration unevenness in a streak form in the printing result.

According to the first exemplary embodiment and the second exemplary embodiment, the printing condition is at least one of inclination (head inclination) of the printing head 19 with respect to the second direction and the distance (PG) between the printing medium 30 and the printing head 19.

Effects of the present exemplary embodiment are described more specifically.

For example, it is assumed that the head inclination with the inclination β has a tendency that the second region is printed lighter than the first region. In this case, the second raster line forming the second region is printed after correction so that concentration is darker in accordance with an extent of the inclination β. Thus, the second region can be prevented at a certain extent from being visually recognized as a light white streak in the printing result. However, the second region is a region smaller than the first region, and hence an effect of suppressing concentration unevenness in a streak form is not enough in some cases when only concentration of the second raster line is corrected. In view of this, in the present exemplary embodiment, some of the first raster lines is printed after correction so that concentration is darker in accordance with an extent of the inclination β. Thus, in the printing result, concentration of the second raster line is complemented more locally with concentration of some of the first raster lines. With this, the second region can be prevented more appropriately from being visually recognized as a light white streak in the printing result. Even when there is a tendency that the second region is printed lighter than the first region, a similar effect can be exerted in a state in which PG is pg 2. As a matter of course, a complementation effect for the second raster line, which is exerted by concentration correction for some of the first raster lines as described above, can be exerted similarly in a case of correction for preventing the second region from being visually recognized as a black streak darker than the first region in accordance with the head inclination and PG.

A combination of the first exemplary embodiment and the second exemplary embodiment also falls within the scope of the present exemplary embodiment.

In other words, the correction value setting unit 12a may set a correction value applied to the second raster line and a correction value applied to some of the first raster lines, in accordance with the head inclination and PG. For example, for the second raster line and some of the first raster lines, the correction value setting unit 12a may simply set a correction value for a raster line with the raster number i to (di+hi)/2. Alternatively, a value obtained by adding, to di and hi, a predetermined weighting value relating to the head inclination and PG may be set as a correction value.

In addition to the printing apparatus and the system, the present exemplary embodiment provides disclosed items in various categories, such as a method executed by the apparatus and the system and the program 12 causing a processor to execute the method. For example, a printing method for controlling the printing head 19 including the plurality of nozzles 21 that eject the ink of the predetermined color and performing printing on the printing medium 30, the printing method includes the correction value setting step, the printing data generation step, and the printing control step. In the correction value setting step, a correction value for each of raster lines for correcting concentration of each raster line expressed by aligning dots of the ink along the first direction is set. In the printing data generation step, the image data is corrected with the correction value for each raster line. In the printing control step, the printing head 19 prints the first region and the second region on the printing medium 30, based on the image data after correction. The first region includes the plurality of first raster lines that are expressed by the ink and are aligned in the second direction intersecting with the first direction. The second region, which is sandwiched between the first regions in the second direction, includes the second raster line expressed by the ink. In the printing control step, the printing head 19 prints one first raster line with the predetermined number of nozzles 21 and prints one second raster line with the number of nozzles 21 more than the predetermined number. In the correction value setting step, a correction value applied to the second raster line and a correction value applied to some of the first raster lines including the first raster lines adjacent to the second region are set in accordance with the printing condition that changes a concentration difference of the second raster line from the first raster line.

5. MODIFICATION EXAMPLES

Some modification examples included in the present exemplary embodiment are described. Combination of the modification examples falls within the scope of the present exemplary embodiment.

Modification Example 1

The correction value setting unit 12a may change, in accordance with the printing condition, the range, in the second direction, of the first raster lines for which a correction value is set in accordance with the printing condition. "Range of the first raster lines in the second direction for which a correction value is determined in accordance with the printing condition" indicates a width of the adjacent region 35 or the adjacent region 36 in the direction D2 and the number of first raster lines forming those regions. Each of the adjacent region 35 and the adjacent region 36 necessarily includes the adjacent raster line. Thus, the minimum width of each of the adjacent region 35 and the adjacent region 36 is a width only corresponding to the adjacent raster, in other words, a width of one first raster line.

It is expected that, as the head inclination β is deviated from the reference value of the head inclination α concentration difference between the first region and the second region is increased. In view of this, in the first exemplary embodiment, for example, as the difference between the reference value of the head inclination and the head inclination β acquired in Step S210 is increased, the correction value setting unit 12a may increase the widths of the adjacent regions 35 and 36 in the direction D2 for which the correction value di is set in Step S220.

Further, as one example, there is expected a tendency that a concentration difference between the first region and the second region is reduced as PG is increased. In this case, in the second exemplary embodiment, as pg2 being usage PG acquired in Step S410 is increased, the correction value setting unit 12a may reduce the widths of the adjacent regions 35 and 36 in the direction D2 for which the correction value hi is set in Step S420. However, when there is a tendency of increasing a concentration difference between the first region and the second region as PG is increased, the correction value setting unit 12a may increase the widths of the adjacent regions 35 and 36 in the direction D2 for which the correction value hi is set in Step S420 as pg 2 being usage PG acquired in Step S410 is increased.

According to this modification example, the range of the first raster lines for which the correction value di and the correction value hi are set is determined in accordance with an extent of the printing conditions such as the head inclination β and usage PG. Thus, an effect of complementing concentration of the second raster line with concentration correction for the first raster line is further optimized, and hence excessive or insufficient complementation can be avoided.

Modification Example 2

When a correction value is set in accordance with the printing condition, the correction value setting unit 12a may set the correction value so that a value applied to each raster line changes linearly from the first raster line to the center of the second region in the second direction.

Figure 11:
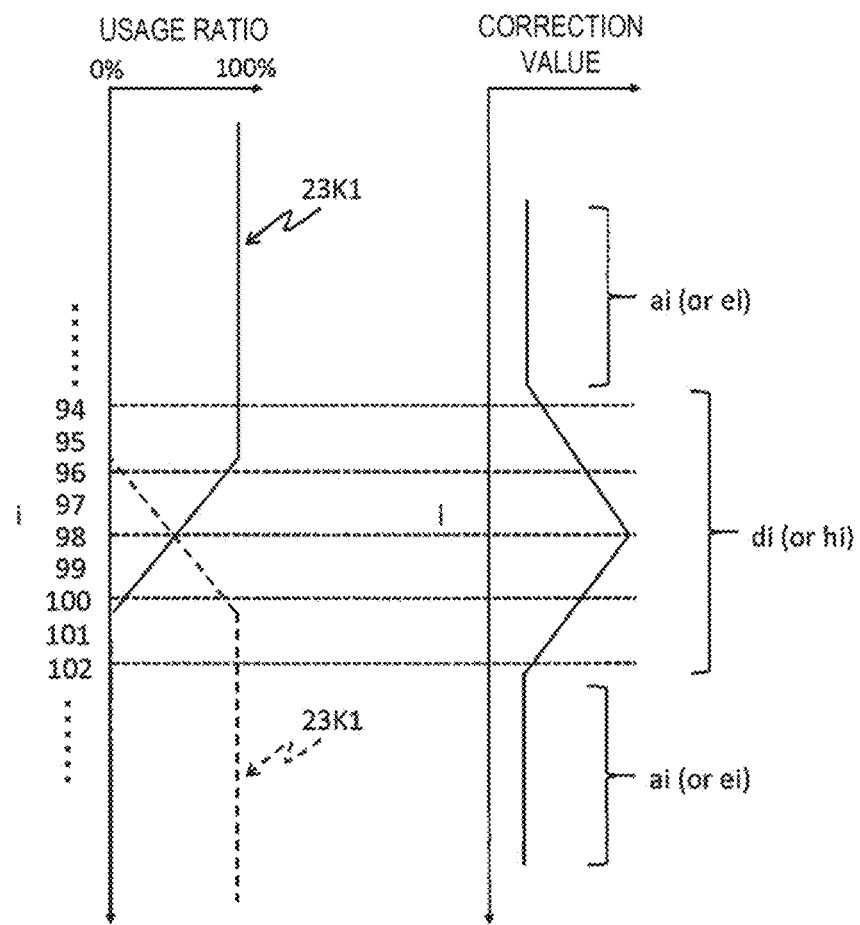
FIG. 11 is a view illustrating a correction value in modification examples.

FIG. 11 is a view describing such a correction value. In FIG. 11, the usage ratio of the nozzles 21 and the correction value for each raster number (variable i) are shown. Similarly to the description given above, the raster lines (i=94, 95) correspond to the first raster lines forming the adjacent region 35, the raster lines (i=96 to 100) correspond to the second raster lines forming the second region 33, and the raster lines (i=101, 102) correspond to the first raster lines forming the adjacent region 36.

In FIG. 11, the usage ratio indicated with the solid line corresponds to the usage ratio of the respective nozzles 21 forming the nozzle row 23K1 being the first nozzle row. The usage ratio indicated with the broken line corresponds to the usage ratio of the respective nozzles 21 forming the nozzle row 23K2 being the second nozzle row. The raster lines up to i=95 are the first raster lines. For printing those first raster lines, the usage ratio of the respective nozzles 21 in the normal portion of the nozzle row 23K1 is 100%, and the usage ratio of the respective nozzles 21 in the nozzle row 23K2 is 0%. Further, the raster lines after i=101 are the first raster lines. For printing those first raster lines, the usage ratio of the respective nozzles 21 in the normal portion of the nozzle row 23K2 is 100%, and the usage ratio of the respective nozzles 21 in the nozzle row 23K1 is 0%.

According to FIG. 11, the usage ratio of the respective nozzles 21 in the OL portion 24 of the nozzle row 23K1 for printing the second raster lines (i=96 to 100) is reduced as the raster number is increased. In contrast, the usage ratio of the respective nozzles 21 in the OL portion 24 of the nozzle row 23K2 for printing the second raster lines (i=96 to 100) is reduced as the raster number is reduced. The total of the usage ratio of the nozzles 21 in the nozzle row 23K1 and the usage ratio of the nozzles 21 of the nozzle row 23K2 for printing the second raster lines (i=96 to 100) is always 100% for each second raster line. Therefore, for the second raster line positioned at the center of the second region 33 in the second direction, that is, the second raster line (i=98) in the example of FIG. 11, the usage ratio of the nozzles 21 in the nozzle row 23K1 and the usage ratio of the nozzles 21 of the nozzle row 23K2 for printing this second raster line are substantially 50% to 50%.

Therefore, when the usage ratio as in FIG. 11 is adopted for printing the second region 33, the second raster lines of the second region 33, which are closer to the center, have a tendency of increasing a concentration difference from the first raster line. In contrast, the second raster lines closer to the first region 32 or the second raster lines closer to the first region 34 in the second region 33 are printed mainly by using the nozzles 21 in any one of the first nozzle row and the second nozzle row, and hence such second raster lines have a tendency of reducing a concentration difference from the first raster line. Thus, it can be said that a correction extent differs for each of the second raster lines forming the second region 33.

In view of this, in Step S220 or Step S420 as illustrated in FIG. 11, for example, the correction value setting unit 12a sets the correction value di or the correction value hi that is set for each of some of the first raster lines and the second raster line so that the value changes linearly from a part of each of the first regions sandwiching the second region the second region therebetween to the center of the second region in the second direction. In the example of FIG. 11, the correction value di or the correction value hi indicates a positive correction value, in other words, a correction value for increasing concentration of some of the first raster lines or the second raster line, and the raster lines closer to the center of the second region 33 have a correction value for increasing concentration to a larger extent. As a matter of course, in a case of a negative correction value, in other words, a correction value for reducing concentration of some of the first raster lines or the second raster line, the raster lines closer to the center of the second region 33 have a correction value for reducing concentration to a larger extent. Note that FIG. 11 illustrates the correction value ai or the correction value ei that is applied to each of the first raster lines other than some of the first raster lines, as a constant value, in a simplified manner. According to this modification example, the correction value di or the correction value hi can be set to an appropriate value substantially corresponding to a concentration difference for each raster line in accordance with the usage ratio of the nozzles 21.

In Step S220 or Step S420, the correction value setting unit 12a executes the processing described above in the first exemplary embodiment or the second exemplary embodiment. With this, as a result, the correction value di or the correction value hi that changes linearly from the adjacent regions 35 and 36 to the center of the second region 33 in the second direction can be set in some cases. Alternatively, when the correction value di or the correction value hi that changes linearly towards the center of the second region in the second direction cannot be set by merely executing the processing described above in the first exemplary embodiment or the second exemplary embodiment, the correction value setting unit 12a may add further adjustment to the correction value to set the correction value di or the correction value hi that changes linearly towards the center of the second region in the second direction.

Modification Example 3

In Step S110 and S120, the correction value setting unit 12a may set the predetermined inclination correction value bi for each of the plurality of different values of inclination α, and may set the correction value offset amount ci from a difference between the reference correction value ai and the predetermined inclination correction values bi for each of the plurality of values of inclination α. Further, in Step S220, the correction value setting unit 12a may set the correction value di by adopting the correction value offset amount ci that is set from a difference between the reference correction value ai and the predetermined inclination correction value bi for the inclination α that is closest to the inclination β. Similarly, in Step S310 and S320, the correction value setting unit 12a may set the predetermined PG correction value fi for each of the plurality of different values of pg 1, and may set the correction value offset amount gi from a difference between the reference correction value ei and the predetermined PG correction value fi for each of the plurality of values of pg1. Further, in Step S420, the correction value setting unit 12a may set the correction value hi by adopting the correction value offset amount gi that is set from a difference between the reference correction value ei and the predetermined PG correction value fi for pg 1 that is closest to pg 2.

Modification Example 4

The present exemplary embodiment may be applied to a so-called serial-type inkjet printer that scans the printing head 19 with a movable carriage, instead of a line-type inkjet printer as illustrated in FIG. 2. In other words, the printing head 19 illustrated in FIG. 2 is mounted to a carriage (not illustrated), and is caused to scan by the carriage along the direction D1. In this case, the transport direction of the printing medium 30 by the transport unit 18 is not the direction D1, but the direction D2. In other words, transport of the printing medium 30 in the direction D2 by a certain distance and scanning of the printing head 19 are combined to each other. With this, printing on the printing medium 30 is performed. Further, in a case of the serial-type inkjet printer, the number of head chips 22 included in the printing head 19 may be one. In other words, the distance by which the transport unit 18 transports the printing medium 30 between the scan and the subsequent scan performed by movement of the carriage is set to a predetermined distance that is smaller than the length of the nozzle row 23 in the direction D2. With this, the printing image on the printing medium 30 can be formed of the first region and the PL-printed second region.

Modification Example 5

Description is given above while assuming a configuration in which the first raster lines forming the first region are printed by one (predetermined number) nozzle 21 that ejects the ink of the predetermined color and the second raster lines forming the second region are OL-printed by two (more than the predetermined number) nozzles 21 that eject the ink of the predetermined color. However, the first region and the second region are only required to establish a relationship of having the different numbers of nozzles 21 of the same color that is used for printing for a raster line. Therefore, for example, the present exemplary embodiment is applicable to a configuration in which two (predetermined number) nozzles 21 for ejecting the ink of the predetermined color for a raster line performs OL-printing in the first region and four nozzles 21, which are more than the predetermined number, for ejecting the ink of the predetermined color for a raster line performs OL-printing in the second region.

What is claimed is:

1. A printing apparatus, comprising:
a printing head including a plurality of nozzles configured to eject ink of a predetermined color;
a correction value setting unit configured to set a correction value for each of raster lines for correcting concentration of each raster line, the raster line being expressed by aligning dots of the ink along a first direction;
a printing data generation unit configured to correct image data with the correction value for each raster line; and
a printing control unit configured to cause the printing head to print a first region and a second region on a printing medium, based on the image data after correction, the first region including a plurality of first raster lines that are expressed by the ink and are aligned in a second direction intersecting the first direction, the second region being sandwiched between the first regions in the second direction and including at least one second raster line expressed by the ink, wherein
the printing control unit causes the printing head to print one of the first raster lines with a first predetermined number of the nozzles and to print one of the at least one second raster line with a second predetermined number of the nozzles, the second predetermined number being greater than the first predetermined number, and
the correction value setting unit sets a second correction value applied to the at least one second raster line in accordance with a printing condition that changes a concentration difference of the at least one second raster line from the first raster lines, and sets a first correction value applied to some of the first raster lines including an adjacent one of the first raster lines that is adjacent to the second region in accordance with the printing condition and the second correction value.

2. The printing apparatus according to claim 1, wherein the printing condition is at least one of inclination of the printing head with respect to the second direction and a distance between the printing medium and the printing head.

3. The printing apparatus according to claim 1, wherein the correction value setting unit changes, in accordance with the printing condition, a range, in the second direction, of the first raster lines for which the first correction value is set in accordance with the printing condition.

4. The printing apparatus according to claim 1, wherein when the correction value is set in accordance with the printing condition, the correction value setting unit sets the correction value so that a value applied to each raster line linearly changes from the first raster lines to a center of the second region in the second direction.

\* \* \* \* \*